March 21, 1967 P. N. RIGOPULOS ETAL 3,309,843
LIQUID HANDLING SYSTEM

Filed Oct. 10, 1962 2 Sheets-Sheet 1

INVENTORS
RICHARD H. BLACKMER
PETER N. RIGOPULOS
BY
ATTORNEY

United States Patent Office 3,309,843
Patented Mar. 21, 1967

3,309,843
LIQUID HANDLING SYSTEM
Peter Nicholas Rigopulos, Boston, and Richard Hardin Blackmer, Topsfield, Mass., assignors to General Electric Company, a corporation of New York
Filed Oct. 10, 1962, Ser. No. 229,679
8 Claims. (Cl. 55—35)

This invention relates generally to a means for collecting, transporting and storing a liquid and, more specifically, to a means especially adapted to perform these functions as efficiently in the absence of gravity as in the presence of gravity.

There are many instances when it is desirable to remove a liquid from a compartment. An illustration is a chemical reaction taking place within a compartment where the chemical reaction produces a liquid as a by-product and the continual accumulation of liquid tends to smother the chemical reaction. In order to maintain the efficiency of the reaction it is necessary to remove the liquid at, or near, the rate it is produced.

One example of this problem is the operation of a hydrogen-oxygen fuel cell wherein electrical energy is generated by the chemical reaction of hydrogen with oxygen through the medium of an ion exchange membrane. In the case of cationic membranes this reaction produces water at the cathode side of the membrane. The cathode side of the membrane generally forms one wall of a compartment into which oxygen is introduced. As the generation of electrical energy progresses, water accumulates within the compartment. If the process continues long enough at power levels such that water is formed more rapidly than it evaporates, the compartment becomes substantially filled with water whereupon the reaction is extinguished due to lack of oxygen in communication with the electrode. Means must, therefore, be provided to remove the water as it is produced by the reaction taking place at the membrane electrode interface.

Under normal conditions, i.e., under conditions where gravity is present, no unusual problems are encountered in removing the water. It is generally sufficient just to provide a drain at the lowermost point in the compartment. However, when the fuel cell is to be employed in a zero-gravity environment a simple drain is ineffective because, without gravity the water does not establish a definite interface with the oxygen. The water and the oxygen "float" around within the compartment in a random intermixture, i.e., the oxygen contains the water as a vapor. Applying a suction means to the compartment would result in a withdrawal from the compartment of both water and oxygen which is undesirable since removal of the oxygen is not only unnecessary but costly because the oxygen must be recaptured or wasted.

It is also necessary to transport the liquid to remove it from the compartment, either to a disposal means or to a storage means. Many of the aforementioned problems resulting from zero-gravity environment are experienced when normal means are employed to transport a liquid having a gas entrained therein. Applying a pressure differential to a conventional conduit to transport liquid, even in the presence of gravity, requires that the conduit be completely filled with liquid prior to applying the pressure differential. If this is not done, a gas blow-by will occur. In other words, the gas entrained in the conduit will provide a low resistance passage which will result in the gas being pumped along with the liquid. To overcome this problem, the liquid to be pumped is usually pooled and then delivered to the conduit to assure that the conduit is filled with water. However, under zero-gravity conditions, it is difficult to pool the liquid for the reasons discussed above.

It is, therefore, an object of this invention to provide an improved means of removing a liquid from a compartment containing gas and liquid phases.

Another object of the invention is to provide an improved transporting and storing means for a liquid.

Another object of this invention is to provide an improved means for separating a liquid from a gas.

A further object of this invention is to provide a collecting, transporting and storing means for a liquid which will perform these functions in a zero-gravity environment without gas blow-by.

Briefly stated, in accordance with one aspect of the invention, there is provided a condensing surface within the compartment from which liquid is to be removed. A plurality of capillary wicks are positioned on the condensing surface to absorb liquid as it condenses from the vapor laden gas phase on the cooler surface of the condenser. In addition a plurality of wicks are positioned on the condensing surface to absorb liquid which has been formed in another area of the compartment but which is brought in contact with the wicks by any means. The wicks transport the liquid to an outlet from the compartment by capillary action. At the outlet, the wicks communicate with a transport and separator means comprising a wick having a gas impervious outer casing. Capillary action causes saturation of the last-mentioned wick. Means are provided to create a pressure differential along the transport means to propel the saturant liquid from the last-mentioned wick in a direction away from the compartment. A storage means may be provided to receive the liquid from the transport means.

While the specification concludes with claims particularly pointing out and distinctly claiming the subject matter which is regarded as the invention, it is believed the invention will be better understood from the following description taken in connection with the accompanying drawings, in which:

Figure 1:
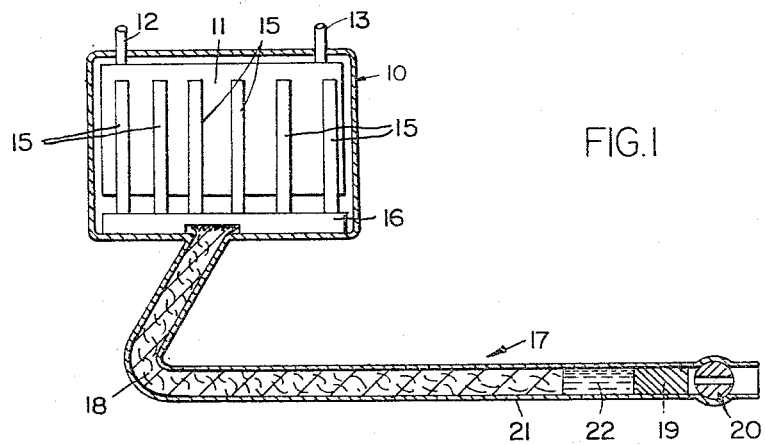
FIGURE 1 is a sectional view of one embodiment of the invention.

Referring now to the drawings and in particular to FIGURE 1, there is shown a compartment 10 having a condensing surface 11 disposed therein. The condensing surface 11 may be supported by any suitable means, the exact means not being important to the present invention. Conduits 12 and 13 transport a cooling medium to and from the condensing surface 11 to maintain thereby the condensing surface 11 at a temperature sufficiently below that of the ambient within the compartment 10 so that any moisture tends to migrate toward the condensing surface.

A plurality of wicks 15 are disposed within the compartment 10 in liquid receiving relation with the condensating surface 11. The wicks 15 may be supported by, or secured to, the condensing surface 11 or they may be independently supported. The only requirement is that they be positioned so as to contact the liquid condensing on the condensing surface 11. The wicks 15 may have any cross-sectional configuration although a rectangular configuration, with a long edge parallel to the condensing surface 11, proves to be the most efficient. The wicks 15 may be constructed from any suitable wicking material which will provide a conventional capillary action. The only requirement for the material from which the wicks 15 are made, is that it be inert to the liquid being transported. The wicks 15 terminate at a reservoir 16 of absorbent material such as felt which may be bonded to, or supported by, one wall of the compartment 10.

In accordance with the invention, a transport means, shown generally at 17, is provided to remove the liquid collecting at the reservoir 16 and transport it from the compartment 10. The transport means 17 includes a transport wick 18, a filter 19 and a valve 20. The transport wick 18 and the filter 19 are each enclosed by a tubular gas-impervious skin or casing 21 which extends from the compartment 10 to the valve 20. The skin or casing 21 may be integral with the wall of the compartment 10 as shown in FIGURE 1 or it may be separate therefrom and secured thereto by any suitable means which provide an effective seal. The same is true of the connection between the valve 20 and the casing 21. The filter 19 may be of any suitable type, for example, simply a piece of activated charcoal. The filter itself is not important to the present invention and may be omitted without affecting the efficiency of the transport system. The filter is provided in the event that the liquid being removed from the compartment 10 is to be employed after removal for some purpose which would require that the liquid be free from any impurities which may have resulted from the reaction taking place in compartment 10. This arrangement provides gas-free liquid 22 at the outlet of the transport wick 18.

The operation of the above described arrangement is as follows. Liquid, forming as a result of the reaction taking place within compartment 10, condenses out on the condensing surface 11 whereupon it is absorbed by the wicks 15. By conventional wicking action, i.e., capillary action, the liquid is transported to the reservoir 16. As the reservoir 16 becomes saturated, the liquid is conducted, by capillary action, to the transport wick 18. Conventional wicking action will eventually cause saturation of the transport wick 18. Upon saturation of the transport wick 18, valve 20 may be opened thereby impressing a pressure differential across the transport means 17 due to the fact that a higher pressure exists within compartment 10 than at the outlet of valve 20. This pressure differential causes the saturant liquid in the transport wick 18 to be propelled toward the valve 20. It has been found by experimentation that no gas will escape, or be passed through the transport wick 18, until substantially all of the saturant liquid has been propelled from the transport wick. If the production of liquid in compartment 10 is sufficient to maintain saturation of the transport wick 18, liquid can be removed from the compartment 10 and transported therefrom by the above described arrangement without loss of gas from compartment 10.

It should be noted at this point that the above-described operation in no way requires the presence of gravity and, therefore, the apparatus or arrangement will function equally as well in the absence of gravity as in the presence of gravity.

Figure 2:
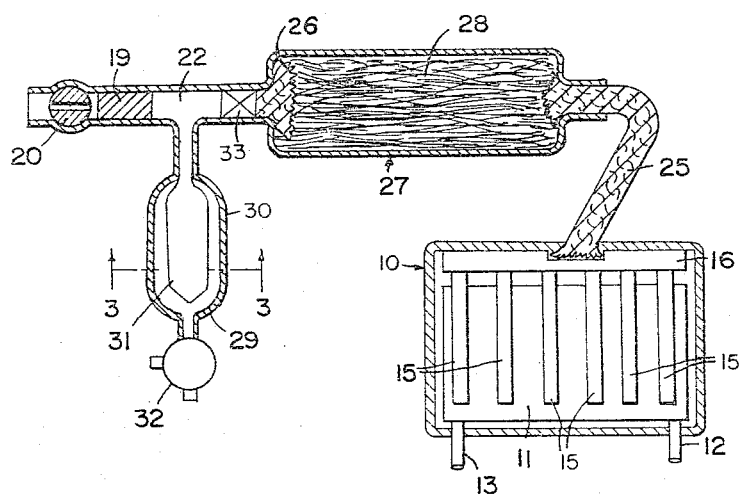
FIGURE 2 is a sectional view of a second embodiment of the invention which includes a separate liquid storage means.
Figures 3, 4:
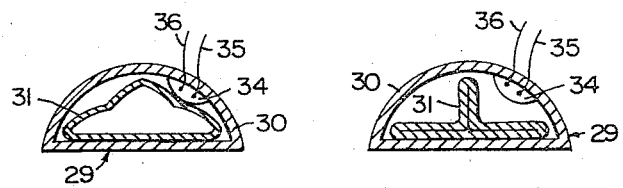
FIGURE 3 is a sectional view of the liquid storage means, of the embodiment shown in FIGURE 2, taken along line 3—3.
FIGURE 4 is a view similar to FIGURE 3 showing the liquid storage means when it is empty.

As pointed out above, the arrangement of FIGURE 1 requires a higher pressure within the compartment 10 than is present at the outlet valve 20. Referring now to FIGURES 2, 3, and 4, there is shown a modification of the present invention which will perform satisfactorily when the compartment 10 has an internal pressure equal to, or less than, that present at the outlet of valve 20. In the arrangement shown in FIGURE 2, many of the elements are identical to those described above with hegard to the arrangement shown in FIGURE 1. These elements have been given identical numerals.

Referring now to FIGURE 2, a transport wick 25 extends through a wall of the compartment 10 from the reservoir 16 to a gas separator 26. The transport wick 25 does not require a gas-impervious casing as in the embodiment shown in FIGURE 1 since there is no pressure differential to maintain. The gas separator 26 is provided with a gas-impervious casing 27 which serves as a housing for a quantity of absorbent material 28 which completely fills the casing 27.

A pump 29 is provided to create a pressure differential across the gas separator 26. The pump 29 comprises an outer casing 30 and a resilient bladder 31 disposed within the casing 30. A valve 32 is provided on the casing 30 to control the pressure in the area between the casing 30 and the bladder 31. A check valve 33 is provided between the gas separator 26 and the pump 29 to allow the liquid to flow from the separator 26 toward the pump 29 but to prevent flow of the liquid in the opposite direction.

FIGURE 3 illustrates the pump 29 with the bladder 31 substantially filled with liquid. When the bladder 31 becomes filled, it contacts a microswitch 34 which is electrically connected to a signaling device (not shown) by means of electrical conductors 35 and 36. FIGURE 4 illustrates the pump 29 with the bladder 31 empty.

The operation of the arrangement shown in FIGURES 2, 3, and 4 is as follows. Liquid, condensing on the surface 11 is transported to the reservoir 16 by means of capillary action in wicks 15 in a manner identical to that described above with reference to the arrangement shown in FIGURE 1. The liquid is transported from the reservoir 16 to the gas separator 26 by capillary action taking place in transport wick 25. The absorbent material 28 within the gas separator 26 becomes saturated with the liquid by capillary action. Once the absorbent material 28 becomes saturated, the area in pump 29 between the outer casing 30 and the resilient bladder 31 is evacuated thereby causing an expansion of the bladder 31. This expansion of the bladder 31 causes a lower pressure at the pump inlet than at the point where the transport wick 25 communicates with the gas separator 26. This pressure differential propels the saturant liquid in the gas separator 26 through check valve 33 and into the bladder 31. The expansion of the bladder 31 continues until substantially all of the saturant liquid is propelled from the absorbent material 28 or until the bladder expands to its full capacity as shown in FIGURE 3. At this time valve 32 is actuated to discontinue the evacuation of the area between the housing 30 and the bladder 31 of the pump 29.

If the bladder 31 has not expanded to its complete capacity when all of the saturant liquid has been removed from the absorbent material 28, the pump may be left in the partially filled condition until more liquid is transported into the gas separator 26 by means of capillary action in transport wick 25. When the absorbent material 28 again becomes saturated, the pumping action may be resumed and continued until the bladder becomes filled to its capacity. At this point, valve 32 may be actuated to pressurize the area in pump 29 between the casing 30 and the bladder 31 thereby to impress a pressure upon the liquid 22 greater than the pressure existing at the outlet of valve 20. Check valve 33 will prevent the liquid 22 from re-entering the gas separator 26. Valve 20 may then be opened to remove the liquid 22 from the pump 29.

The absorbent material 28 may be comprised of any suitable material which will provide capillary action upon the liquid being transported with one requirement being that the absorbent material is inert to the liquid being transported. It has been found by experimentation that, if water is the liquid being transported, pure wood cellulose in the form of tough, white fibers of 1 to 2 microns diameter and 35 to 165 microns in length provides satisfactory results. The absorbent material, in the form of wood cellulose, is packed into the casing 27 at a density of 10 to 20 pounds per cubic foot. The pure wood cellulose described above is manufactured by the Brown Company and is commercially available under the trademark Solka-Floc.

From the foregoing description it will be apparent that the transport wick 25 and gas separator 26 together constitute a capillary means within which the liquid from compartment 10 will be distributed. The transport wick 25 functions as a transport means which supplies liquid to the gas separator. The absorbent material 28 functions as a medium for storage of liquid transported by the wick. As will be apparent from its greater cross-sectional area, the gas separator lends greater storage capacity to the capillary means than could be provided by the transport wick 25 alone. The gas separator thus provides a liquid storage section of the capillary means.

Gas-free liquid is obtained at the outlet end of the gas separator 26 or, stating the result differently, liquid is transported through the gas separator 26 without gas blow-by. The result occurs because the absorbent material 28 prefers to conduct the fluid with the greatest surface tension. The gas entrained in the absorbent material is, therefore, selectively held in the gas separator 26 while the capillary flow paths, formed by the absorbent material, carry the liquid through the separator. This phenomenon also allows substantially complete removal of the saturant liquid from the absorbent material 28, after the supply of liquid from transport 25 has been discontinued, because a gas-liquid interface is established and moves along the gas separator as the saturant is propelled therefrom. The surface tension forces acting on the saturant liquid at the exit of the gas separator prevent gas blow-by as the saturant liquid is being removed. The gas-liquid interface is maintained at the exit of the gas separator without gas blow-by even with no liquid flow providing that the differential pressure forces from gas to liquid do not exceed the surface tension forces between saturant liquid and the porous separator material and providing that free liquid is kept in contact with the exit side of the separator. For a given pressure differential and temperature the maximum flow rate occurs when the inlet of the separator is covered with liquid. The flow rate between zero and maximum is a function only of the amount of liquid brought to the separator inlet.

Figure 5:
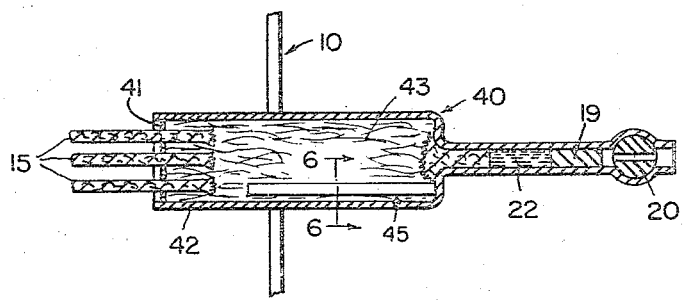
FIGURE 5 is a sectional view of a third embodiment of the invention.
Figure 6:
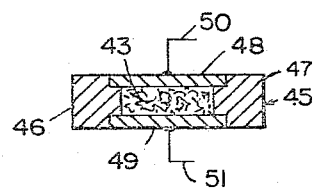
FIGURE 6 is a sectional view taken along line 6—6 of FIGURE 5.

FIGURES 5 and 6 illustrate a further embodiment of the present invention. Referring in particular to FIGURE 5, the wicks 15 extend from the condensing surface 11, not shown, in a manner similar to that described above with regard to the embodiments illustrated in FIGURES 1 and 2. However, instead of terminating at a reservoir as in the above embodiments, the wicks 15 extend into a gas separator 40. The gas separator 40 is positioned in one wall of the compartment 10. The wicks 15 are secured to the gas separator by means of a screen 41 which in turn is secured to the outer casing 42 of the gas separator 40. It has been found desirable to space evenly the wicks 15 over the area of the screen 41 to distribute more uniformly the liquid entering the gas separator 40.

The outer casing 42 of the gas separator 40 is filled with an absorbent material 43 similar to the absorbent material 28 of the embodiment of FIGURE 2. A filter 19 and a valve 20 are provided in a manner similar to the above-described embodiments of the present invention.

The operation of this embodiment is similar to that of the embodiment illustrated in FIGURE 1 in that the gas-free liquid 22 is propelled from the gas separator 40 due to a higher pressure in compartment 10 than is present at valve 20. It should be appreciated that one skilled in the art could incorporate the pump 29 shown in FIGURE 2 into the arrangement shown in FIGURE 5 so that the arrangement shown in FIGURE 5 could be employed in a situation where the pressure within compartment 10 was equal to, or less than, the pressure present at valve 20. Liquid is transported from a condensing surface (not shown) by capillary action of wicks 15 into the gas separator 40 whereupon the absorbent material 43 becomes saturated by capillary action therein. After the absorbent material 43 has become saturated, valve 20 may be opened thereby allowing the pressure differential between the compartment 10 and outlet valve 20 to propel the saturant liquid out through valve 20.

A liquid content sensing means 45 may be provided in the gas separator 40 to indicate the degree of saturation of the absorbent material 43. The sensing means 45 is shown in cross-sectional detail in FIGURE 6 and comprises two insulative members 46 and 47 which support a pair of capacitance plates 48 and 49 in spaced relation to each other. The capacitance plates 48 and 49 may be secured to the insulative members 46 and 47 by any suitable means. The area between the capacitance plates 48 and 49 is filled with absorbent material 43. As liquid enters the gas separator 40 by capillary action, the absorbent material between the capacitance plates 48 and 49 becomes saturated to the same degree that the absorbent material filling the remainder of the gas separator 40 becomes saturated. Since the absorbent material in the area between the capacitance plates 48 and 49 serves as a dielectric, varying degrees of saturation will cause proportional changes in the dielectric constant. These changes in the dielectric constant will be reflected by changes in the capacitance between the plates 48 and 49. Electrical leads 50 and 51 are provided to transmit these changes in capacitance to an indicating system (not shown).

As pointed out above, the present invention provides an effective means for collecting, transporting and storing a liquid under zero-gravity conditions. The above described arrangements in no way depend upon gravity for effective performance. However, it should be appreciated that the present arrangement will operate in the presence of gravity as effectively as it will in the absence of gravity and, therefore, the present invention is not limited to applications in zero-gravity conditions.

As will be evident from the foregoing description, certain aspects of the present invention are not limited to the particular details of construction of the examples illustrated. For example, the concepts described herein are well suited for urine collection in a space capsule as well as separation of the solid and gaseous constituents from the liquid constituents of urine. Another example is space capsule environmental control which requires condensation of moisture and a means for separating the condensate from the air without losing air. It is also contemplated that various and other modifications or applications will occur to those skilled in the art. It is therefore intended that the appended claims shall cover such modifications and applications as do not depart from the true spirit and scope of the invention.

What we claim as new and desire to secure by Letters Patent of the United States is:

1. A method of selectively removing liquid from a compartment containing a gas-vapor mixture and substantially removed from the influence of gravity comprising
    condensing said vapor to a liquid on a solid surface within the compartment,
    transporting by capillary action the condensed vapor from the surface directly to a conduit containing a wick extending from the compartment to a point exterior of the compartment, and
    establishing a positive pressure within the compartment with respect to the exterior point to expel liquid from the conduit.

2. Means for removing liquid from a compartment comprising:
    a capillary means consisting of a transporting section and a liquid storage section,
    said transporting section comprising a wick means extending from a liquid-receiving position within said compartment to said liquid storage section,
    said liquid storage section comprising a gas separator including
        a body of absorbent material separate from and of greater cross-sectional area than said wick means, a gas-impervious outer casing contiguously surrounding said body having an outlet and inlet opening, said wick means of said transporting section being connected to the inlet opening of said casing to deliver liquid to said liquid storage section.

3. Means for removing liquid from a compartment as set forth in claim 2 additionally including means to control liquid flow from said outlet opening of said casing.

4. Means for removing liquid from a compartment as set forth in claim 2 additionally including means mounted within said casing to sense and signal a predetermined level of liquid concentration in said absorbent material.

5. Means for removing liquid from a compartment comprising:

a condensing means within said compartment, a capillary means consisting of a transporting section and a liquid storage section, said transporting section comprising a wick means extending from a liquid receiving relation with said condensing means within said compartment to said liquid storage section, said liquid storage section comprising a gas separator including a body of absorbent material separate from and of greater cross-sectional area than said wick means, a gas-impervious outer casing contiguously surrounding said body having an outlet and inlet opening, said wick means of said transporting section being connected to the inlet opening of said casing to deliver liquid to said liquid storage section.

6. Means for removing liquid from a compartment as set forth in claim 5 additionally including pump means in communication with said gas separator for creating a lower pressure at said outlet of said separator than at said inlet comprising:

a rigid outer casing, a resilient bladder within said outer casing, and means to selectively pressurize or evacuate the area between said outer casing and said bladder, and a check valve positioned between said outlet of said gas separator and said pump to prevent liquid flow from said pump toward said gas separator.

7. The combination comprising a compartment containing a gas-vapor mixture, means defining a solid condensing surface within said compartment, capillary means within said compartment contacting said condensing surface capable of collecting liquid from the condensing surface at zero gravity, a gas impervious casing attached to said compartment and extending externally thereof, wick means mounted in said casing and in liquid-receiving relation to said capillary means, and means maintaining a positive pressure within said compartment, whereby liquid contained within said capillary means may be expelled externally of said compartment.

8. The combination according to claim 7 in which said compartment encloses a fuel cell.

References Cited by the Examiner

UNITED STATES PATENTS

| | | | |
|---|---|---|---|
| 1,195,905 | 8/1916 | Brown et al. | 261—99 |
| 2,291,912 | 8/1942 | Meyers | 103—44 |
| 2,621,608 | 12/1952 | McIntyre | 103—44 |
| 2,857,979 | 10/1958 | Van Kijck | 55—431 X |
| 2,920,459 | 1/1960 | Ladusaw | 62—281 |
| 3,062,153 | 11/1962 | Losey | 103—44 X |

REUBEN FRIEDMAN, *Primary Examiner.*

C. N. HART, *Assistant Examiner.*